United States Patent
Brunet et al.

(10) Patent No.: US 8,106,556 B2
(45) Date of Patent: Jan. 31, 2012

(54) EMERGENCY ROLLING BEARING THAT IS INSENSITIVE TO AXIAL LOAD

(75) Inventors: Maurice Brunet, Ste Colombe Pres Vernon (FR); Luc Baudelocque, Vernon (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 318 days.

(21) Appl. No.: 12/502,478

(22) Filed: Jul. 14, 2009

(65) Prior Publication Data
US 2010/0021100 A1    Jan. 28, 2010

(30) Foreign Application Priority Data
Jul. 25, 2008 (FR) .................... 08 55131

(51) Int. Cl.
*H02K 7/09* (2006.01)
(52) U.S. Cl. ............ 310/90.5; 310/90; 384/624
(58) Field of Classification Search .......... 310/90, 310/90.5; 384/624, 102, 584
See application file for complete search history.

(56) References Cited

U.S. PATENT DOCUMENTS

| | | | | |
|---|---|---|---|---|
| 3,844,630 A | * | 10/1974 | Lechner | 384/99 |
| 4,058,353 A | * | 11/1977 | Frommlet et al. | 384/492 |
| 4,629,261 A | * | 12/1986 | Eiermann et al. | 310/90.5 |
| 5,977,677 A | * | 11/1999 | Henry et al. | 310/90.5 |
| 7,217,039 B2 | * | 5/2007 | Baudelocque et al. | 384/624 |
| 2011/0085753 A1 | * | 4/2011 | Tecza | 384/462 |

FOREIGN PATENT DOCUMENTS
EP    1395758    3/2006

\* cited by examiner

*Primary Examiner* — Dang D Le
(74) *Attorney, Agent, or Firm* — Weingarten, Schurgin, Gagnebin & Lebovici LLP

(57) ABSTRACT

The emergency rolling bearing for a rotary machine having magnetic bearings includes at least first and second bearing members with radial clearance of value $\epsilon_r/2$ that is of the order of half the mean radial air gap $\epsilon_r$ of the magnetic bearings being arranged between each of the bearing members and the rotor, and axial clearances $\epsilon_a$ are provided on either side of the set of bearing members between said set and first and second axial abutment elements secured to the rotor. The first bearing member is mounted directly in a first intermediate support element coaxial with a stator element. The second bearing member is mounted in a second intermediate support element likewise coaxial with the stator element. The intermediate support elements present a plane of contact in a radial plane perpendicular to the axis of the bearing and they are united by a resilient pre-stressed element acting in the axial direction and allowing the intermediate support elements and the bearing members to expand or move apart in the axial direction. Damper means acting in the radial direction are interposed between the intermediate support elements and the stator element.

7 Claims, 1 Drawing Sheet

EMERGENCY ROLLING BEARING THAT IS INSENSITIVE TO AXIAL LOAD

FIELD OF THE INVENTION

The present invention relates to an emergency rolling bearing that is insensitive to axial load, for a rotary machine having magnetic bearings presenting a mean air gap relative to a rotor, the emergency bearing comprising at least first and second bearing members such that radial clearance of value $\epsilon_r/2$ that is of the order of half the mean radial air gap $\epsilon_r$ of the magnetic bearings is provided between each of the first and second bearing members and the rotor, and axial clearances $\epsilon_a$ are formed on either side of the first and second bearing members between said assembly and first and second axial abutment elements secured to the rotor.

PRIOR ART

An emergency mechanical device, known as an emergency bearing, has already been described, in particular in patent documents FR 2 613 791 and EP 1 395 758 B1, designed to guarantee total integrity of a rotary machine having active magnetic bearings in the event of the magnetic bearings being overloaded or in the event of the electrical or electronic control device failing, or indeed in the event of the magnetic suspension being turned off.

In document EP 1 395 758 B1, there is proposed in particular an emergency bearing comprising, as shown in FIG. 2, two rolling bearings, each having a stator ring 1, a rotor ring 2, and rolling elements 3 disposed between the stator and rotor rings 1 and 2. The rotor rings 2 are separated from the rotor 6 by radial clearance 4 and they are also separated from first and second axial abutment elements 7 and 8 by axial clearances 5.

An intermediate support element 9 is interposed between the stator rings 1 and a stator element 10, with radial clearances 11, 13 relative to the stator element 10, which is fastened to the stator 15. Springs 12 fastened to two extreme sides of the intermediate support element 9 act axially on the rolling member by exerting bidirectional pre-loading. Damper means acting in the radial direction are interposed in the clearance 13 and very low friction contact means 14 are provided between the facing faces perpendicular to the axis of rotation of the intermediate element 9 and of the stator element 10.

Such an emergency device can act as a damper regardless of the direction of the axial load. Nevertheless, that type of configuration does not make it possible to avoid thermal expansion of the bearing in its housing, which thermal expansion can cause the balls and the rings to be highly stressed and can lead to the bearing being destroyed.

To remedy that drawback, one possible solution might consist in interposing a second resilient device 13' possibly analogous to the damper means interposed in the clearance 13, but at the interface between the outer rings 1 of the bearing constituting the stator rings and the intermediate element 9 acting as a support for the stator rings, thereby allowing the bearing to expand without stress.

Although that solution would provide an improvement to the prior art and would enable the problem of thermal expansion to be solved, it nevertheless presents the drawback of increasing the radial deflection of the assembly.

OBJECT AND SUMMARY OF THE INVENTION

The present invention seeks to remedy the above-mentioned drawbacks by providing an emergency bearing presenting a high level of operating safety with limited wear.

More particularly, the invention seeks to make it possible simultaneously to reduce the temperature rise of the bearing and the associated consequences of the bearings expanding thermally, and to limit the radial deflection of the assembly.

These objects are achieved by an emergency rolling bearing that is insensitive to axial load, for a rotary machine having magnetic bearings presenting a mean air gap relative to a rotor, the emergency bearing comprising at least first and second bearing members such that radial clearance of value $\epsilon_r/2$ that is of the order of half the mean radial air gap $\epsilon_r$ of the magnetic bearings is provided between each of the first and second bearing members and the rotor, and axial clearances $\epsilon_a$ are formed on either side of the first and second bearing members between said assembly and first and second axial abutment elements secured to the rotor, wherein:

the first bearing member is mounted directly in a first intermediate support element that is coaxial with a stator element;

the second bearing member is mounted in a second intermediate support element that is likewise coaxial with said stator element;

the first and second intermediate support elements present a plane of contact in a radial plane perpendicular to the axis of the bearing and are united by a resilient pre-stressed element acting in the axial direction and allowing the first and second intermediate support elements and the first and second bearing members to expand or move apart in the axial direction; and damper means in the radial direction are interposed between firstly the first and second intermediate support elements and secondly the stator element.

More particularly, the emergency bearing includes two annular end plates presenting a very low coefficient of friction that are fastened to the stator element and between which the intermediate support elements are inserted with clearance.

The resilient pre-stressed element may comprise a helical spring.

In a first possible embodiment, the damper means comprise a corrugated metal ribbon interposed between the facing cylindrical faces of the intermediate support elements and the stator element centered on the axis of the bearing.

In another possible embodiment, the damper means comprise a visco-elastic ring interposed between the facing cylindrical faces of the intermediate support elements and the stator element centered on the axis of the bearing.

In a first application of the invention, the emergency bearing includes a central rotor and first and second bearing members disposed on the outside around said central rotor.

In another application, the emergency bearing includes a peripheral rotor of tubular shape and first and second bearing members disposed on the inside facing the peripheral rotor.

BRIEF DESCRIPTION OF THE DRAWING

Other characteristics and advantages of the invention appear from the following description of particular embodiments, given as examples and with reference to the accompanying figures, in which.

DETAILED DESCRIPTION OF PREFERRED EMBODIMENTS

Figure 1:
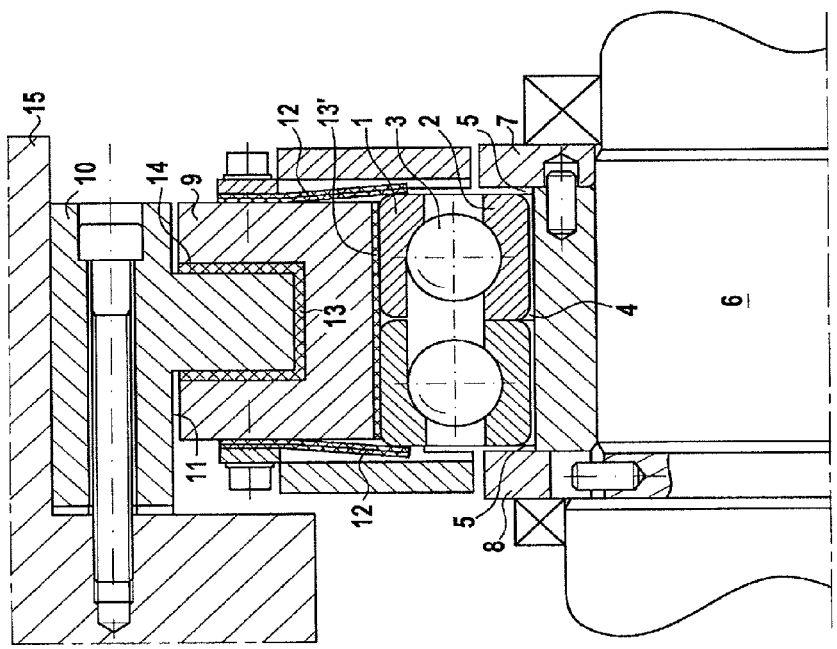
FIG. 1 is an axial half-section view of an emergency bearing of the invention that is adapted to limit both the temperature rise of the bearing and the radial deflection.
Figure 2:
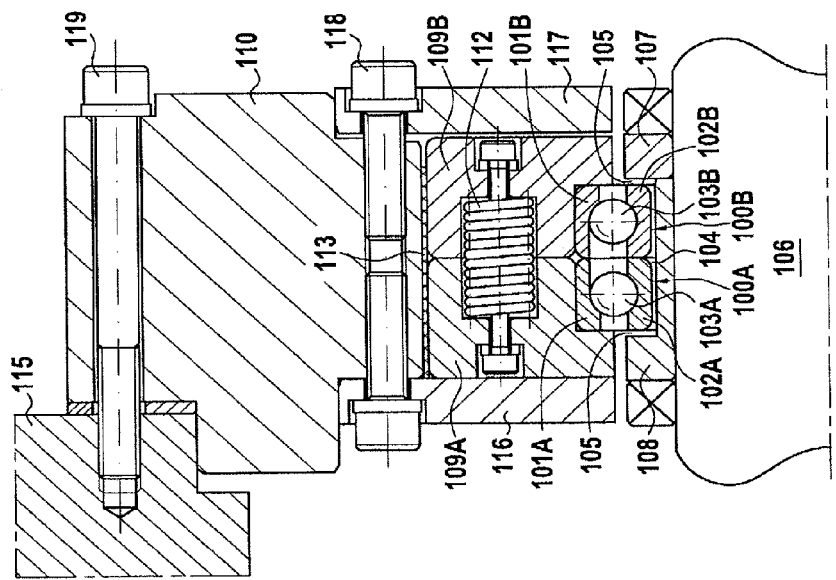
FIG. 2 is an axial half-section view of a prior art emergency bearing modified to reduce the effects of a rise in the temperature of the bearing.

FIG. 1 shows a preferred embodiment of an emergency rolling bearing in accordance with the invention.

The emergency bearing shown in FIG. 1 is designed to be used in combination with an active magnetic bearing (not shown in the drawing).

In FIG. 1, there can be seen a rotor 106 and a stator 115 that may present various configurations, i.e. in particular the rotor 106 may either be inside or else outside the stator 115.

The emergency bearing essentially comprises a double rolling bearing 100A, 100B. Each bearing 100A, 100B comprises a stator ring 101A or 101B, a rotor ring 102A or 102B, and rolling elements 103A or 103B disposed between the stator and rotor rings 101A, 102A, or 101B, 102B.

In normal operation of the radial magnetic bearings from which the emergency bearing is associated, the rotor rings 102A and 102B of the bearings are separated from the rotor 106 by radial clearance 104 of value $\epsilon_r/2$ that is about half the value of the air gap $\epsilon_r$ of the magnetic bearings.

The value $\epsilon_r/2$ of the radial clearance may advantageously lie in the range 0.15 millimeters (mm) to 0.3 mm, however it could also lie outside this range, depending on the application.

The rotor rings 102A and 102B are spaced apart respectively from a first axial abutment element 107 and a second axial abutment element 108 by axial clearances 105 of value $\epsilon_a$ that advantageously lies in the range about 0.2 mm to about 0.5 mm, but that could also lie outside said range, depending on the application. These axial clearances enable the bearing to present axial movement in either direction in the event of an axial load.

In accordance with the invention, the first bearing 100A is mounted in a first intermediate support element 109A. Damper means 113 are interposed between said intermediate support element 109A and a support element 110 that is fastened to the stator 115 via fastener elements 119 such as screws.

The second bearing 100B is likewise mounted in a second intermediate support element 109B. The damper means 113 are also interposed between the second intermediate support element 109B and the stator support element 110.

The first and second intermediate support elements 109A and 109B present a plane of contact in a radial plane perpendicular to the axis of the bearing and of the rotor 106. The two intermediate support elements 109A and 109B are united by a resilient pre-stressed element 112, e.g. in the form of a helical spring acting axially and allowing the first and second bearings to expand by moving the intermediate elements 109A and 109B away from the first and second bearings in the axial direction.

The intermediate support elements 109A and 109B are inserted with clearance between two annular end plates 116 and 117 that are fastened to the stator element 110 by fastening means 118 such as bolts. These plates are selected to have a very low coefficient of friction and a maximum surface area.

The damper means 113 interposed between the cylindrical faces of the intermediate support elements 109A and 109B situated beside the stator, and a cylindrical face of the stator element 110 situated facing the intermediate support elements 109A and 109B may be constituted by a corrugated metal ribbon or by a visco-elastic ring.

The bearings 100A and 100B are received respectively in the first and second intermediate support elements 109A and 109B on their sides opposite from the plane of contact between the intermediate elements 109A and 109B.

Whatever the axial load applied to the emergency bearing system, the radial friction coming from said axial load cannot oppose free movement in a radial direction of the system because of the low coefficient of friction of the plates 116 and 117.

The bearings 100A and 100B are mounted directly in the intermediate support elements 109A and 109B, which constitute two support elements put under resilient free loading by the spring 112. Given the excellent thermal contact between the stator rings 101A, 101B, and the intermediate support element 109A, 109B, thermal expansion of the stator rings 101A and 101B is greatly limited.

Furthermore, under the effect of the rotor rings 102A, 102B and of the balls 103A, 103B expanding thermally, they exert pressure on the stator rings 101A, 101B along the contact angle of the bearings. Under this force, the two intermediate support elements 109A and 109B can move apart from each other without excessively stressing any of the parts of the assembly.

The above-described assembly also presents the dual advantages of limiting radial deflection because no damper means of any kind are interposed between the stator rings 101A and 101B and the intermediate support elements 109A, 109B, and of limiting the temperature rise of the bearings and thus the risk of destruction associated with expansion as a result of the intermediate support elements 109A and 109B being in the form of at least two parts that can expand or move apart without stress, thereby allowing the stator rings 101A and 101B of the bearings to move apart and also to expand without stressing the bearings.

What is claimed is:

1. An emergency rolling bearing that is insensitive to axial load, for a rotary machine having magnetic bearings presenting a mean air gap relative to a rotor, the emergency bearing comprising at least first and second bearing members such that radial clearance of value $\epsilon_r/2$ that is of the order of half the mean radial air gap $\epsilon_r$ of the magnetic bearings is provided between each of the first and second bearing members and the rotor, and axial clearances $\epsilon_a$ are formed on either side of the first and second bearing members between said assembly and first and second axial abutment elements secured to the rotor, wherein:

the first bearing member is mounted directly in a first intermediate support element that is coaxial with a stator element;

the second bearing member is mounted in a second intermediate support element that is likewise coaxial with said stator element;

the first and second intermediate support elements present a plane of contact in a radial plane perpendicular to the axis of the bearing and are united by a resilient pre-stressed element acting in the axial direction and allowing the first and second intermediate support elements and the first and second bearing members to expand or move apart in the axial direction; and damper means in the radial direction are interposed between firstly the first and second intermediate support elements and secondly the stator element.

2. An emergency bearing according to claim 1, including two annular end plates presenting a very low coefficient of friction that are fastened to the stator element and between which the intermediate support elements are inserted with clearance.

3. An emergency bearing according to claim 1, wherein the resilient pre-stressed element comprises a helical spring.

4. An emergency bearing according to claim 1, wherein the damper means comprise a corrugated metal ribbon interposed between the facing cylindrical faces of the intermediate support elements and the stator element centered on the axis of the bearing.

5. An emergency bearing according to claim 1, wherein the damper means comprise a visco-elastic ring interposed between the facing cylindrical faces of the intermediate support elements and the stator element centered on the axis of the bearing.

6. An emergency bearing according to claim 1, including a central rotor and first and second bearing members disposed on the outside around said central rotor.

7. An emergency bearing according to claim 1, including a peripheral rotor of tubular shape and first and second bearing members disposed on the inside facing the peripheral rotor.

* * * * *